Feb. 21, 1956 W. T. HICKS ET AL 2,735,629
TAKE-UP REEL APPARATUS
Filed July 20, 1954 2 Sheets-Sheet 1

INVENTORS
W. T. HICKS
J. E. LEARD
W. G. PHARO
BY
W. C. Parnell
ATTORNEY

Feb. 21, 1956

W. T. HICKS ET AL 2,735,629

TAKE-UP REEL APPARATUS

Filed July 20, 1954

2 Sheets-Sheet 2

INVENTORS
W. T. HICKS
J. E. LEARD
W. G. PHARO
BY
W. C. Parnell
ATTORNEY

United States Patent Office 2,735,629
Patented Feb. 21, 1956

2,735,629

TAKE-UP REEL APPARATUS

William T. Hicks, Glen Rock, Jack E. Leard, East Orange, and William G. Pharo, Paterson, N. J., assignors to Western Electric Company, Incorporated, New York, N. Y., a corporation of New York Application July 20, 1954, Serial No. 444,512

5 Claims. (Cl. 242—25)

This invention relates to reeling or strand take-up apparatus and particularly to apparatus for securing a take-up reel on an arbor.

Continuous running reeling machines used in telephone wire manufacture generally include take-up reels mounted adjacent one another in banks of two, each securely positioned, usually under spring pressure, on individually driven arbors. In such machines means are provided for automatically transferring the wire which is being wound, from a take-up reel which has been filled to an empty take-up reel without stopping the machine. The filled reel is then unloaded and an empty reel put on in its place while the winding continues. With such an arrangement it is particularly desirable to have simple operating mounting apparatus which will permit mounting the two take-up reels as close together as possible in order to simplify switching the wire from one reel to the other.

It is, therefore, the principal object of this invention to provide simplified apparatus to facilitate the mounting of reels on an arbor in such machines.

According to the general features of the invention, applicant has provided a reel retaining member for locking a reel on an arbor and which also includes means for catching a wire and securing it thereto when the wire is switched between reels in order to insure a proper start of the winding on the empty reel.

In a preferred embodiment of the invention, a reel retaining member is provided with two opposed pins extending radially into a central opening therein for the arbor. On the end of the arbor two opposed helical grooves for the pins permit the retaining member to be mounted thereon. A spring biased bar for locking the retaining member on the arbor slides in a longitudinal slot in the arbor which extends transversely therethrough and into the helical grooves. As the retaining member is turned on the arbor, the pins force the bar back in the slot clear of the helical grooves permitting the retaining member to be moved further until the pins are free of the bar at which time the bar will be forced back across the helical grooves to lock the retaining member on the arbor. Means are provided for moving the bar out of the helical grooves to permit removal of the retaining member from the arbor for changing reels.

These and other features of the invention will be more fully understood from the following detailed description taken in conjunction with the accompanying drawing, in which.

Figure 1:
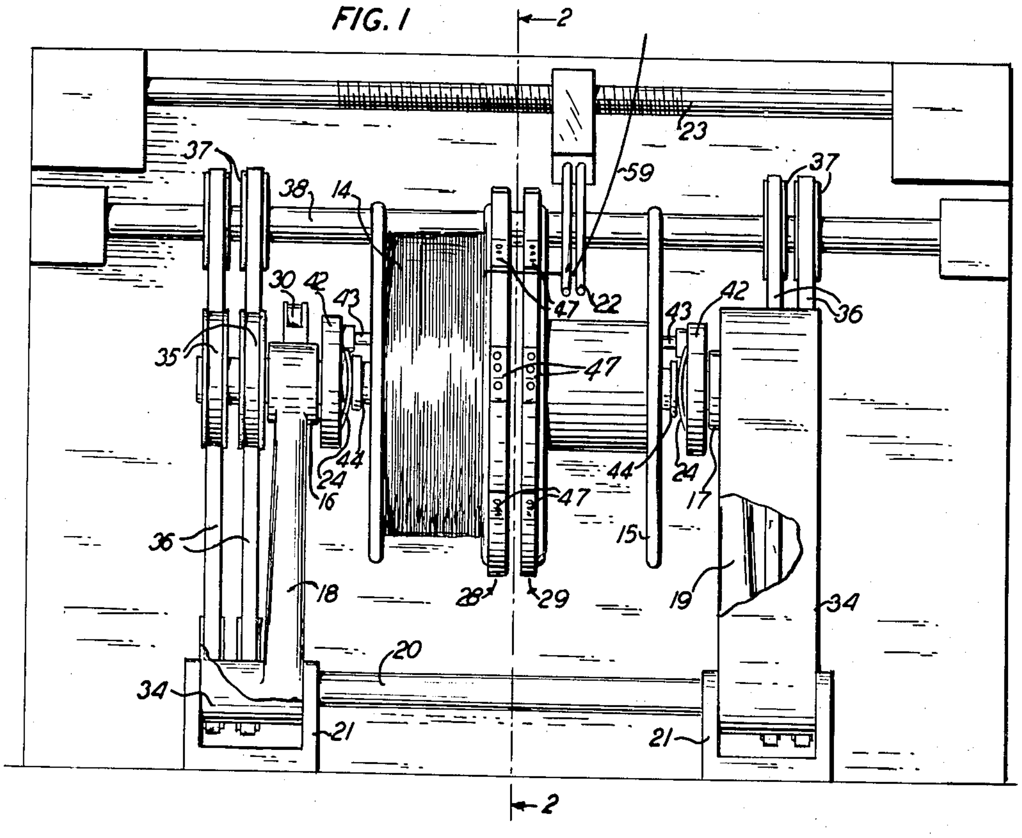
Fig. 1 is a partially broken away, front elevational view of a double reel wire take-up machine utilizing reel retaining members according to the invention.

Referring now to the drawing, Fig. 1 shows a typical two reel take-up machine in which wire reels 14 and 15 are mounted on arbors 16 and 17 journalled in the end of support members 18 and 19 respectively in housings 34. The reels 14 and 15 are secured on their shafts by retaining members 28 and 29 respectively which are held on to their shafts by pins 31 extending therefrom which will be described below. Pulleys 35 in the housings and on the ends of the arbors are driven by belts 36 which in turn are driven by pulleys 37 on drive shaft 38. The support members 18 and 19 are pivotally mounted on shaft 20 which is journalled in a pair of bearings 21 bolted to the floor.

Figure 2:
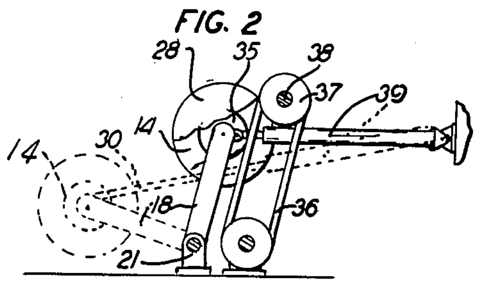
Fig. 2 is a reduced simplified view of the device of Fig. 1 along the plane of line 2—2 showing one of the reels in its loading position.

Wire 59 to be reeled is guided by fingers 22, the reciprocation of which is controlled by a reversible screw mechanism 23. The wire is reciprocated back and forth between the flanges of one of the reels 14 until it is filled when the screw mechanism 23 is shifted so that the finger control mechanism will pass the wire over to the adjacent empty spool 15. The fingers will then be reciprocated back and forth between the flanges of reel 15. By actuating an air cylinder 39 (Fig. 2), arm 30 is moved outwardly to pivot the loaded reel member 18 forward to disconnect the drive mechanism therefrom and to facilitate changing reels.

Figure 5:
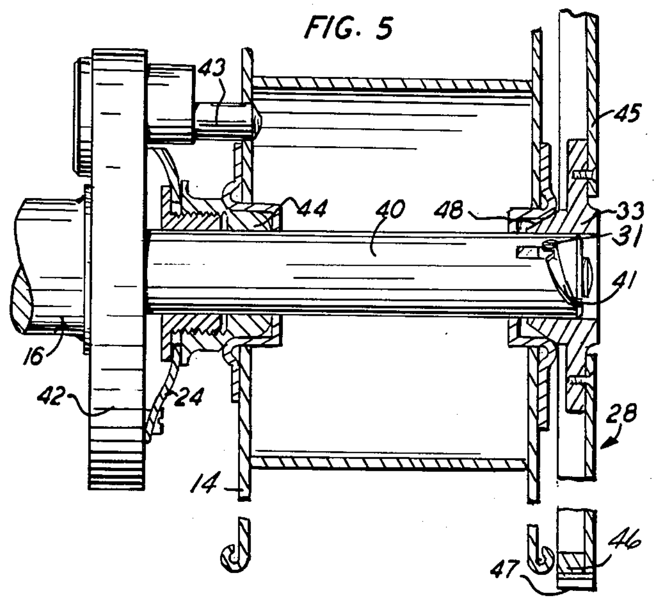
Fig. 5 is a front elevational view, partially in section, of the reel mounting portion of one of the arbors.
Figure 6:
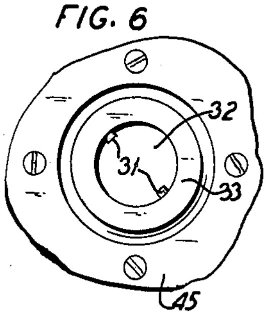
Fig. 6 is an end view of the mounting aperture of one of the retaining members.

As seen in Fig. 5, each of the arbors 16 and 17 is provided with a reduced diameter reel receiving portion 40, the inner end of which has welded thereto an annular ring 42 having a reel engaging drive pin 43 thereon. A support hub 44 for the reel is slidably held on the arbor by a leaf spring 24 bolted on the ring 42.

Figure 10:
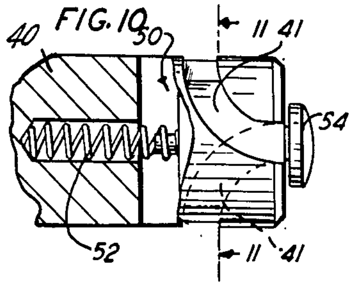
Fig. 10 shows the shaft locking mechanism partially in section.
Figure 11:
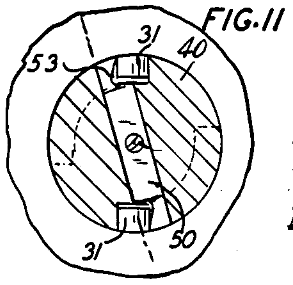
Fig. 11 is a view of the device of Fig. 10 as seen along the plane of line 11—11.

The end of each arbor 16 and 17 is provided with a pair of opposed helical grooves 41 (Fig. 10) to receive the reel retaining members 28 and 29 respectively which, together with the locking means therefor, comprise the principal subject matter of the present invention.

The retaining members 28 and 29 each comprise a hub 33, a plate 45 and a rim 46 to which a plurality of wire catch springs 47 are mounted. The inner side 48 of the hub 33 is tapered to center a reel 14 (Fig. 5) axially on the portion 40 of the arbor. Extending radially into a central mounting aperture 32 of the hub 33 are two opposed pins 31 which ride in the helical grooves 41 on the end of the arbor. The helical grooves 41 make it possible for the retaining member to be locked on the arbor against the pressure exerted by leaf spring 24 on the reel. The pins of the member ride in the helical grooves 41, being inserted into the open ends thereof at the end of the arbor.

Figure 7:
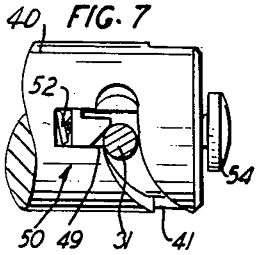
Figs. 7, 8 and 9 show the different conditions of the locking mechanism when a retaining member is secured to and released from the arbor.
Figure 8:
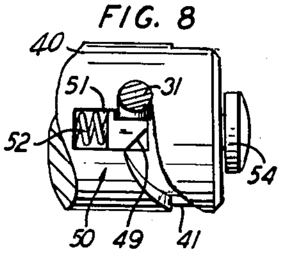
Figure 9:
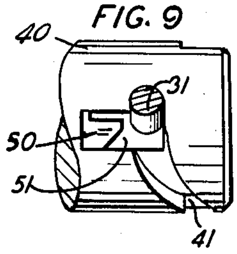

Slidably mounted in a longitudinal slot 51 which extends transversely through the arbor and across the helical grooves 41, is a spring biased locking bar 50. The bar 50 is normally held in its locking or forward position across the helical grooves as seen in Fig. 8. When a retaining member is turned on the arbor, the pins 31 thereof engage beveled surfaces 49 on each end of the bar 50 to force the bar back in its slot (Fig. 7) to permit the member to be turned further. As the pins are moved past the locking bar, the bar 50 is returned forward across the helical grooves by its spring 52 to lock the pins 31 in the closed ends of the grooves (Fig. 7). Partial cylindrical contours 53 for pins 31 are provided in the surface of the bar 50 opposite the beveled surfaces 49 to prevent a backward, unlocking movement of the bar 50 by the force exerted thereon by pins 31.

Figure 12:
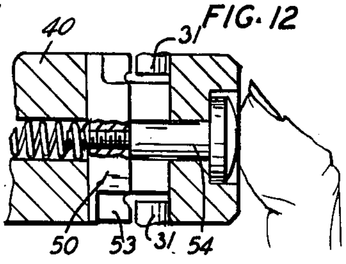
Fig. 12 is a view corresponding to Fig. 10 showing the release mechanism actuated.

A release pin 54 which is screwed into the bar 50 extends through an axial hole in the arbor and may be manually depressed (Fig. 12) against the pressure of spring 52 to remove the bar 50 from the helical grooves and permit removal of the retaining member 28. The threaded portion of the pin 54 extends through the bar 50 for positioning the spring against the bar.

Figure 3:
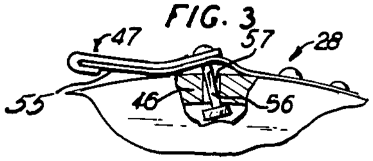
Figs. 3 and 4 are partial side elevational views of the rim of the retaining member showing a wire catch spring in normal and operated conditions respectively.

In addition to the above described means for supporting the take-up reel on the arbor, the members 28 and 29 also perform a second important function namely that of catching the wire 59 as it is switched from a full reel to an empty one in order to secure the wire to start the winding on the empty reel. The wire catch springs 47 on rim 46 (Figs. 3 and 4) are made of resilient spring steel and have outwardly turned reinforced end portions 55 and riveted, limited movement members 56 which extend through apertures 57 in the rim for limiting the cantilever action of the spring members when a wire 59 is secured therein.

Figure 4:
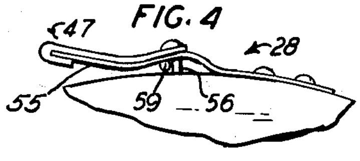

When the wire is switched from one reel to the other, the wire is caught by the outwardly turned end portion 55 on one of the spring members and is forced, by the rotary motion of the reel, down between the member 47 and the rim 46 (Fig. 4). To sever the wire between the two reels, the air cylinder 39 is actuated to pivot the filled reel out to the unloading position. This action breaks the interconnecting length of wire.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Take-up reel supporting apparatus having in combination an arbor having a reel receiving portion with a pair of opposed closed helical grooves opening at one end thereof and a longitudinal slot extending transversely therethrough and across the helical grooves near the closed ends thereof, a movable locking bar in the slot, a spring for normally holding the bar in a locking position in the helical grooves, resilient means on the arbor against which a reel is positioned, a removable reel retaining member for the end of the arbor for holding the reel against the resilient means, said retaining member having a central aperture for the arbor and a pair of opposed pins extending radially into the aperture for guiding the retaining member on the arbor along the helical grooves and for forcing the bar out of the grooves to permit turning the retaining member on the arbor, the bar being free to return to its normal locking position when the retaining member is moved to its final position on the arbor.

2. Take-up reel supporting apparatus having in combination an arbor having a pair of opposed, closed helical grooves opening at one end thereof and a longitudinal slot extending transversely therethrough and across the helical grooves, a spring biased locking bar slidably mounted in the slot normally blocking the grooves, release means for sliding the bar out of the grooves, a resilient member on the arbor against which reels are mounted and a removable reel retaining member for the end of the arbor for holding a reel against the resilient member, said retaining member having a central aperture for the arbor and a pair of opposed pins extending radially into the aperture for guiding the retaining member on the arbor along the helical grooves.

3. Take-up reel supporting apparatus having in combination an arbor having a pair of opposed, closed helical grooves opening at one end thereof and a longitudinal slot extending transversely therethrough and across the helical grooves, a spring biased locking bar slidably mounted in the slot normally blocking the grooves, release means for sliding the bar out of the grooves, a resilient member on the arbor against which reels are mounted and a removable reel retaining member for the end of the arbor for holding a reel against the resilient member, said retaining member comprising a hub having an aperture for the arbor and a pair of opposed pins extending radially therein, one side of the hub being tapered for centering the reel on the arbor, and a disc portion of substantially the same outer diameter as the rim of the reel attached to the hub and a plurality of strand catch springs on the periphery of the disc for catching and holding a strand when it is switched to the reel held on the arbor.

4. Take-up reel supporting apparatus having in combination an arbor having a pair of opposed, closed helical grooves opening at one end thereof and a longitudinal slot extending transversely therethrough and across the helical grooves, a spring biased locking bar slidably mounted in the slot normally blocking the grooves, release means for sliding the bar out of the grooves, a resilient member on the arbor against which reels are mounted and a removable reel retaining member for the end of the arbor for holding a reel against the resilient member, said retaining member comprising a hub having an aperture for the arbor and a pair of opposed pins extending radially therein, the reel engaging side of the hub being tapered for centering a reel on the arbor, and a disc portion attached to the hub with a rim of substantially the same diameter as the rim of the reel and having a plurality of cantilever spring, strand catch members around the outer surface of the rim the catch members having outwardly turned end portions for catching a strand when it is switched across the retaining member to the reel held on the arbor.

5. Take-up reel supporting apparatus having in combination an arbor having a reel receiving portion with a pair of opposed closed helical grooves opening at one end thereof and a longitudinal slot extending transversely therethrough and across the helical grooves near the closed ends thereof, a movable locking bar in the slot, each end of the bar having a beveled surface, a spring for normally holding the bar in a locking position with the beveled surfaces on each end in the grooves and facing the open end of its respective helix, resilient means on the arbor against which a reel is positioned, a removable reel retaining member for the end of the arbor for holding the reel against the resilient means, said retaining member having a central aperture for the arbor and a pair of opposed pins extending radially into the aperture for guiding the retaining member on the arbor along the helical grooves and for engaging the beveled surfaces of the ends of the bar to force it out of the grooves to permit turning the retaining member on the arbor, the bar being free to return to its normal locking position when the retaining member is moved to its final position on the arbor.

References Cited in the file of this patent

UNITED STATES PATENTS

| | | |
|---|---|---|
| 1,366,182 | Hokanson | Jan. 18, 1921 |
| 1,393,286 | Hosford | Oct. 11, 1921 |
| 2,253,848 | Cummings | Aug. 26, 1941 |
| 2,323,677 | Reh | July 6, 1943 |
| 2,337,457 | Dzus | Dec. 21, 1943 |